United States Patent
Nakayama

(10) Patent No.: US 8,419,227 B2
(45) Date of Patent: Apr. 16, 2013

(54) ILLUMINATION DEVICE

(75) Inventor: Takahiro Nakayama, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 248 days.

(21) Appl. No.: 12/482,159

(22) Filed: Jun. 10, 2009

(65) Prior Publication Data

US 2010/0027254 A1 Feb. 4, 2010

(30) Foreign Application Priority Data

Jul. 29, 2008 (JP) ................................. 2008-194439

(51) Int. Cl.
*F21V 7/04* (2006.01)

(52) U.S. Cl.
USPC ........... 362/301; 362/298; 362/346; 358/475; 355/70

(58) Field of Classification Search ................. 362/3, 11, 362/241, 247, 277, 280, 297, 298, 301, 346; 362/296.03–296.05, 296.09, 227, 249.01; 362/249.02; 358/475, 482–484, 509, 512–514; 399/211, 212, 220, 221; 355/67–71; 250/578.1, 250/208.1, 234–236

See application file for complete search history.

(56) References Cited

U.S. PATENT DOCUMENTS

| | | | | |
|---|---|---|---|---|
| 5,642,933 A * | 7/1997 | Hitora | ............................ | 362/243 |
| 7,215,448 B2 * | 5/2007 | Onishi | ........................... | 358/483 |
| 7,413,324 B2 * | 8/2008 | Chang | ............................ | 362/225 |
| 7,556,399 B1 * | 7/2009 | Bailey | ............................ | 362/241 |
| 7,708,428 B2 * | 5/2010 | Park et al. | ...................... | 362/241 |
| 7,920,304 B2 * | 4/2011 | Tatsuno et al. | ................ | 358/475 |
| 2004/0174706 A1 * | 9/2004 | Kan | ............... | 362/241 |
| 2005/0088707 A1 * | 4/2005 | Sakurai et al. | ................ | 358/475 |
| 2005/0094392 A1 * | 5/2005 | Mooney | ......................... | 362/241 |
| 2005/0135117 A1 * | 6/2005 | Lamb et al. | .................... | 362/615 |
| 2005/0190562 A1 * | 9/2005 | Keuper et al. | .................. | 362/325 |
| 2006/0221612 A1 * | 10/2006 | Song et al. | ..................... | 362/247 |
| 2007/0070462 A1 * | 3/2007 | Huang et al. | ................... | 358/509 |
| 2007/0223248 A1 * | 9/2007 | Han | .............................. | 362/612 |
| 2008/0117487 A1 | 5/2008 | Amada et al. | | |
| 2008/0170282 A1 | 7/2008 | Amada et al. | | |
| 2008/0239433 A1 | 10/2008 | Amada et al. | | |
| 2009/0059335 A1 | 3/2009 | Amada et al. | | |
| 2009/0060583 A1 | 3/2009 | Amada et al. | | |
| 2009/0073698 A1 * | 3/2009 | Tatsuno | ......................... | 362/297 |
| 2010/0002273 A1 * | 1/2010 | Schmidt et al. | ................ | 358/475 |

FOREIGN PATENT DOCUMENTS

| | | |
|---|---|---|
| JP | 2006-042016 A | 2/2006 |
| JP | 2006-067551 A | 3/2006 |

* cited by examiner

*Primary Examiner* — Thomas Sember
(74) *Attorney, Agent, or Firm* — Dickstein Shapiro LLP

(57) ABSTRACT

To provide an illumination device in which a point light source and a reflective member based on a light weight, cheap resin material is used, the illumination device has high precision and is strong to environmental variations when in a state assembled as a unit and is easily moldable as a part, a plurality of point light sources (111) is arrayed, a first reflective member (112b, 112c, 112d) is disposed along an outgoing direction of light of the point light sources, a second reflective member (112e) is disposed in a surface opposed to a light emitting surface of the point light source in an orthogonal direction, the point light sources are moved integrally with a part or a whole of the first and the second reflective member, the illumination device irradiates an irradiation surface by light from the point light sources, rib shaped bodies (112a) are disposed in a light passageway side of the first reflective member, the rib shaped bodies includes a reflective surface and is situated at a position of an approximately equal distance from two adjacent point light sources, the rib shaped bodies are disposed to be approximately orthogonal against a straight line connecting the two adjacent point light sources.

10 Claims, 16 Drawing Sheets

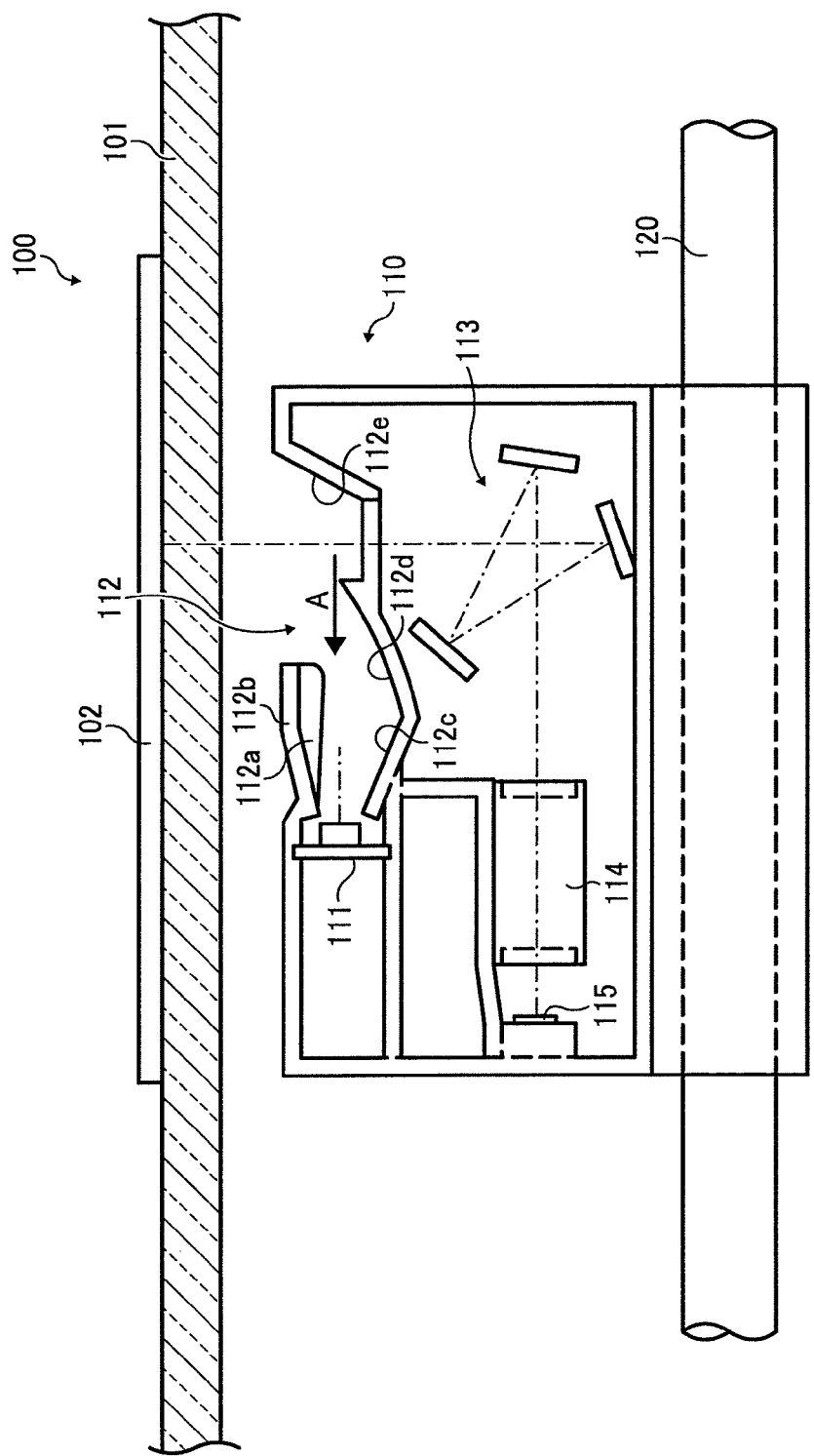

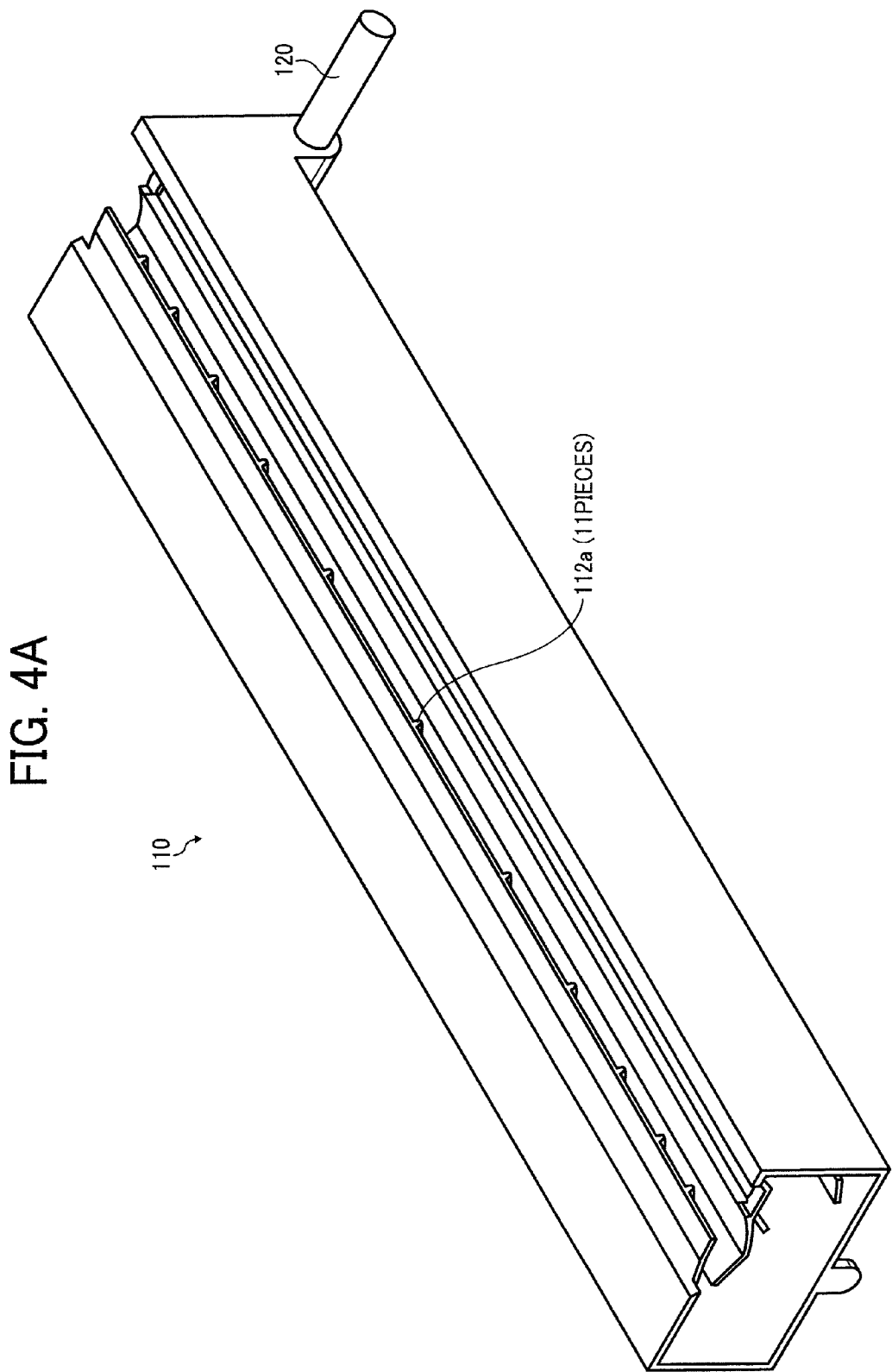

WITH RIB SHAPED BODIES

WITHOUT RIB SHAPED BODIES

CHANGES OF ILLUMINANCE DISTRIBUTION AGAINST A VALUE OF L1/L2

① —— WITHOUT RIB SHAPED BODIES
② —— L1/L2=1
③ --- L1/L2=0.7
④ —·— L1/L2=0.5
⑤ —···— L1/L2=1.4
⑥ —--— L1/L2=1.6

CHANGES OF ILLUMINANCE DISTRIBUTION AGAINST A VALUE OF t/(t+L1+L2)

① —— WITHOUT RIB SHAPED BODIES
② —— t/(t+L1+L2)=0.015
③ --- t/(t+L1+L2)=0.03
④ —·— t/(t+L1+L2)=0.05
⑤ —···— t/(t+L1+L2)=0.08
⑥ —--— t/(t+L1+L2)=0.1

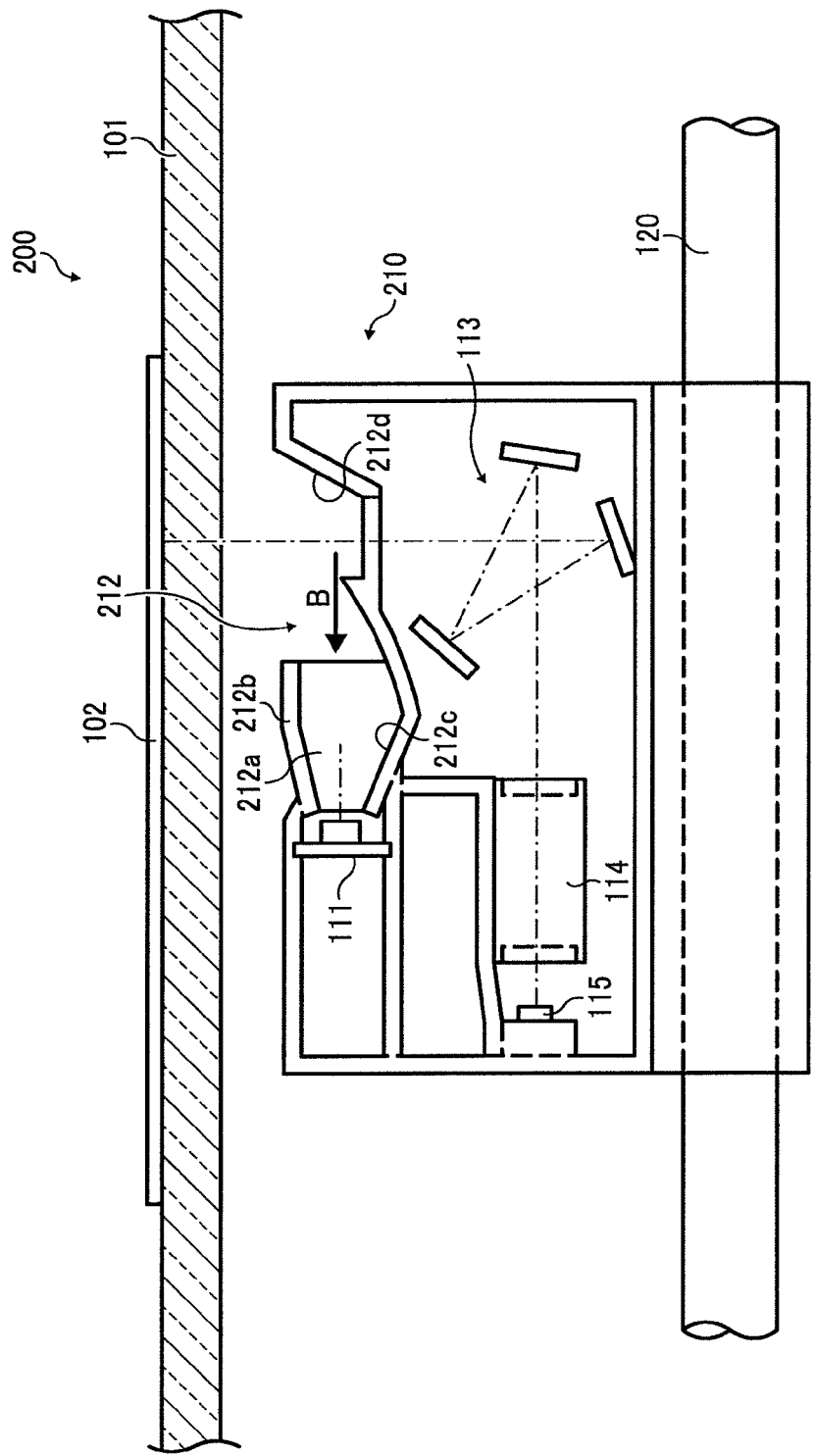

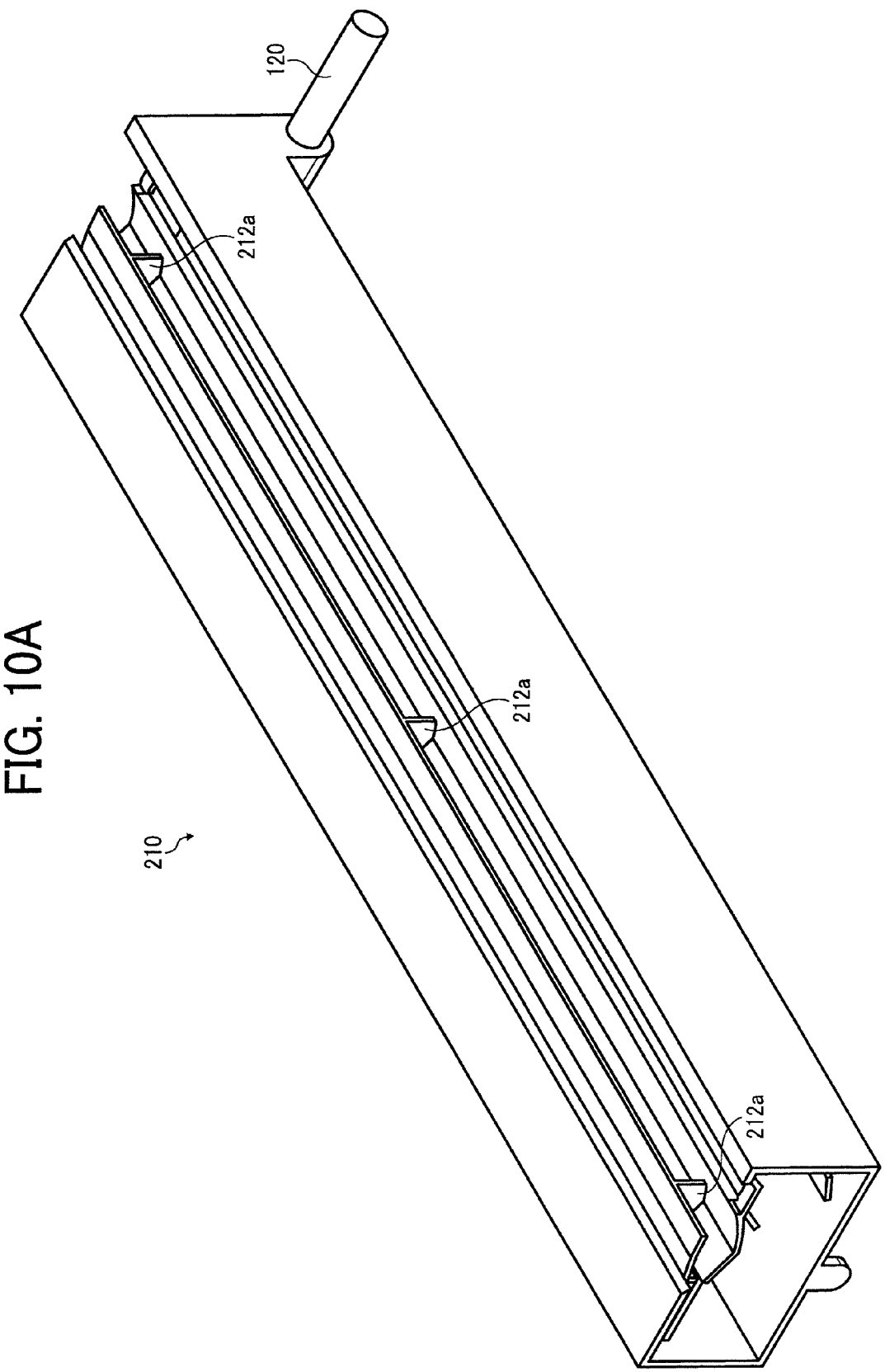

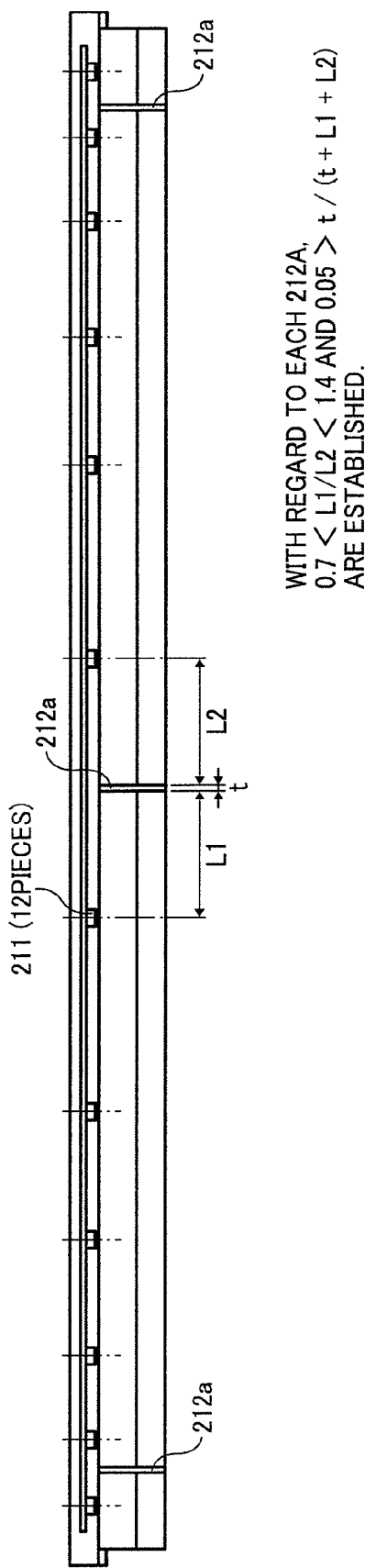

A DIAGRAM VIEWED FROM A DIRECTION OF AN ARROW C IS ILLUSTRATED IN FIG. 14.

ILLUMINATION DEVICE

PRIORITY CLAIM

This application claims priority from Japanese Patent Application No. 2008-194439, filed with the Japanese Patent Office on Jul. 29, 2008, the contents of which are incorporated herein by reference in their entirety.

BACKGROUND OF THE INVENTION

1. Field of the Invention

The present invention relates to an illumination device. In particular, the illumination device of the present invention is easily moldable as a part and is strong to environment variations with a high precision when assembled as a unit in which a point light source and a cheap, light, resin material based reflective member are used.

2. Description of the Related Art

In recent years, developments of light emitting diodes (LED hereinbelow) are performed actively and brightness of LED elements has increased drastically. LED generally has advantages of long life span, high efficiency, high shock absorbing properties and single color emission or the like and applications to a variety of fields of illumination are expected. As one of the purposes of usage, an LED can be used for an image reading apparatus of a digital copier or an image scanner or the like. However, although the current LED has the above described excellent properties, in order to be used for an illumination device of an image reading apparatus, an absolute brightness of a single LED is insufficient. As a result, LED is mostly used around a low speed reading device or a device with emphasis on light weight and compactness. On the other hand, mainly cold cathode fluorescent lamp is used for a high speed reading device and a device of large size. By the way, JP2006-067551A and JP2006-042016A are proposed as conventional technologies in which various innovations are performed so that LEDs are used for an illumination device and an image reading apparatus.

[Descriptions with Regard to a Prior Application]

An illumination device (manuscript illumination device) has been applied by applicants of the present invention in which LEDs are used as light sources (Japanese Patent Application No. 2008-041540). This application uses light sources that drastically save energies in comparison to light sources of tube lamps in order that a small sized illumination unit can be realized so that further energy saving is realized. This application provides a manuscript illumination device or the like of the above objects.

In order to realize the above objects, the manuscript illumination device is constituted as illustrated in FIG. 1. FIG. 1 is an approximate side cross sectional diagram of the manuscript illumination device. As illustrated in FIG. 1, in an illumination system, that is, the manuscript illumination device, LEDs are used as light sources. A reflective surface is disposed between a distance from LEDs arrayed in a longitudinal direction of an irradiated surface to the irradiated surface in order that a light path length can be extended and illumination intensity irregularities in the longitudinal direction of the irradiated surface can be suppressed. In addition, light use efficiency can be improved by optimizing a shape of the reflective surface. However, in this prior application, the reflective surface is thin walled with a broad area of plain surface part. A constitution is adopted in which the reflective surface is connected only at end parts so that the reflective surface must be molded as a part in which a certain degree of flatness is ensured. In addition, by flexures due to self weight or deformation of the reflective surface due to thermal expansion or the like, properties of the above described illumination system can deteriorate. This is a respect that must be necessarily considered when a structure body is set to be made of resin from aims for light weight and small size.

SUMMARY OF THE INVENTION

By the way, in an illumination device and an image reading apparatus using LEDs, a reflective surface is disposed between a distance from LEDs arrayed in a longitudinal direction of an irradiated surface to the irradiated surface in order that illumination intensity irregularities in the longitudinal direction of the irradiated surface can be suppressed and it is necessary to improve light use efficiency by optimizing a shape of the reflective surface. In this case, in order to realize a light weight, small sized illumination device, synthetic resins are generally used as a material that constitutes the reflective surface. By securing a degree of plainness of the reflective surface and eliminating flexures due to a self weight of the reflective member, properties of an illumination system needs to be maintained with high precision. In addition, the device needs to be strong against environmental variations of temperature or the like.

The present invention is made to solve the above problematic points. An object of the present invention is to provide an illumination device easily moldable as a part and strong to environment variations with a high precision when assembled as a unit in which a point light source and a cheap, light, resin material based reflective member is used.

In order to accomplish the above object, an illumination device of the present invention includes a first reflective member (112b, 112c and 112d) disposed along an outgoing direction of light of a plurality of arrayed point light sources (111 of FIG. 3), a second reflective member (112e) disposed in a surface opposed to a light emitting surface of the point light sources in an approximate orthogonal direction in which the point light sources and a part or a whole of the first and the second reflective member are moved integrally while light from the point light sources is irradiated onto an irradiation surface. In the present invention, rib shaped bodies (112a) are disposed in a light passageway side of the first reflective member. The rib shaped bodies include a reflective surface and is situated at a position approximately equal distanced from two adjacent point light sources. The rib shaped bodies are disposed (refer to FIG. 5) approximately orthogonal against a straight line that connects the two adjacent point light sources.

BRIEF DESCRIPTION OF THE DRAWINGS

FIG. 3 is a side cross sectional diagram of an image reading part of a first embodiment of the present invention.

FIG. 4A is an external perspective view illustrating an image reading unit that constitutes the image reading part of the first embodiment.

FIG. 9 is a side cross sectional diagram of an image reading part of a second embodiment of the present invention.

FIG. 10A is an external perspective view illustrating an image reading unit that constitutes the image reading part of the second embodiment.

FIG. 11 is a side surface diagram viewing strengthening rib shaped bodies and a light source part that constitutes the image reading unit of the second embodiment from a direction of an arrow B of FIG. 9.

DETAILED DESCRIPTION OF THE PREFERRED EMBODIMENTS

Figure 1:
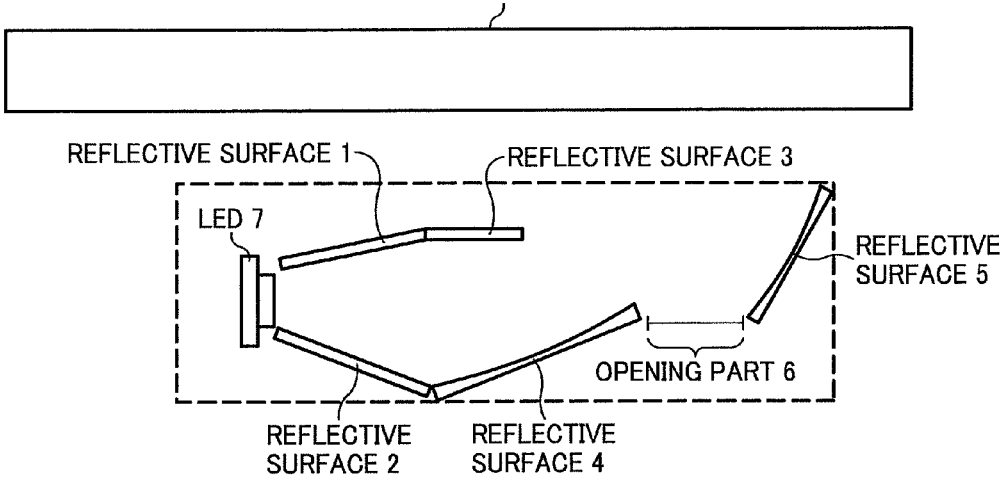
FIG. 1 is an approximate side cross sectional diagram of a manuscript illumination device according to a prior application by applicants of the present application.

According to a constitution of the present invention, influences to the illumination optical system can be minimally suppressed while precision of a structure body that constitutes a reflective optical system can be secured without increases of its volume as a unit. In addition, controls of a warping quantity and a warping direction during molding become easy because rib shaped bodies are disposed in a long, thin and broad plain surface. Furthermore, the rib shaped bodies come into contact with the structure body of the illumination optical system. The rib shaped bodies are comparatively easy to be obtained with high precision as a molded product so that using a shape of a height direction of the rib shaped bodies, a relative distance to the reflective surface, angles and a degree of flatness or the like within the structure body of the illumination optical system can be prescribed. Therefore, a direction of deformation of the reflective surface deformed due to thermal expansion can be controlled. The thermal expansion is because of atmosphere temperature rises.

Before descriptions of embodiment of the present invention, terms used are defined and constitutional members are described.

[Light Source]

In the present invention, point light sources (111) has no limitations in particular if light emitting diodes (LED) with a light emitting surface of a diameter of about a few millimeters is used. Therefore, a product well known in the art can be used but in the present embodiment, white colored LED light source is used. In addition, LEDs should be preferably arrayed in a longitudinal direction of the manuscript. By arraying the LEDs in a longitudinal direction, light can be irradiated in a longitudinal direction of a reading target area.

[Light Guiding Member, Reflective Member]

A light beam converging member and a reflective member of the present invention includes a plurality of reflective surfaces respectively. The reflective surfaces are constituted by forming a reflective surface on a surface of molded products of for example, plastic and glass or the like. In the present invention, a material of the molded products formed with a reflective surface on a surface thereof is not limited to above and other well known materials in the art can be properly applied. In addition, in the present invention, the converging member and/or the reflective member should preferably include a side reflective surface orthogonal to both a longitudinal direction of a manuscript and a manuscript platen in order that light projected from the light source can be controlled to not spread in the longitudinal direction of the manuscript. The reflective surface should further preferably be included in both end parts in a longitudinal direction of the reading target area.

[Reflective Surface]

Reflective surface in the present invention refers to an area with a high reflectance ratio and having a function that guides light projected from the light source to the reading target area. The reflective surface can be manufactured with a high production efficiency with little working processes if formed by aluminum deposition and coating or the like. In addition, if a reflective tape is adhered to a converging part constitutional member and a reflective part constitutional member of the above molded product, a good reflective surface formed by a simple method can be obtained. The reflective tape is preferably a thin adhesion tape with one surface thereof vapor deposited to obtain a high reflectance ratio property. In addition, the reflective surface of the present invention is constituted by a plain surface or a curved surface and is a surface distinguished structurally. The reflective surface can be detached from other reflective surfaces and is constituted as a separate body.

[Contact Glass (Manuscript Platen)]

In addition, the illumination device of the present invention includes a contact glass (101) with manuscripts stacked on a surface thereof. The contact glass (101) is plate shaped and preferably formed by glass or transparent resins or the like. In addition, in the present embodiment, white colored LED is used but light projected from two or more colored LEDs can be mixed for projection. This can be an alternative constitution with no problems. In addition, the illumination device of the present embodiment actually includes reflective surfaces in both end parts of side surfaces but in FIG. 2, this is not illustrated for easy understanding.

A illustrated embodiment of the present invention is described hereinbelow.

[First Embodiment]

Figure 2:
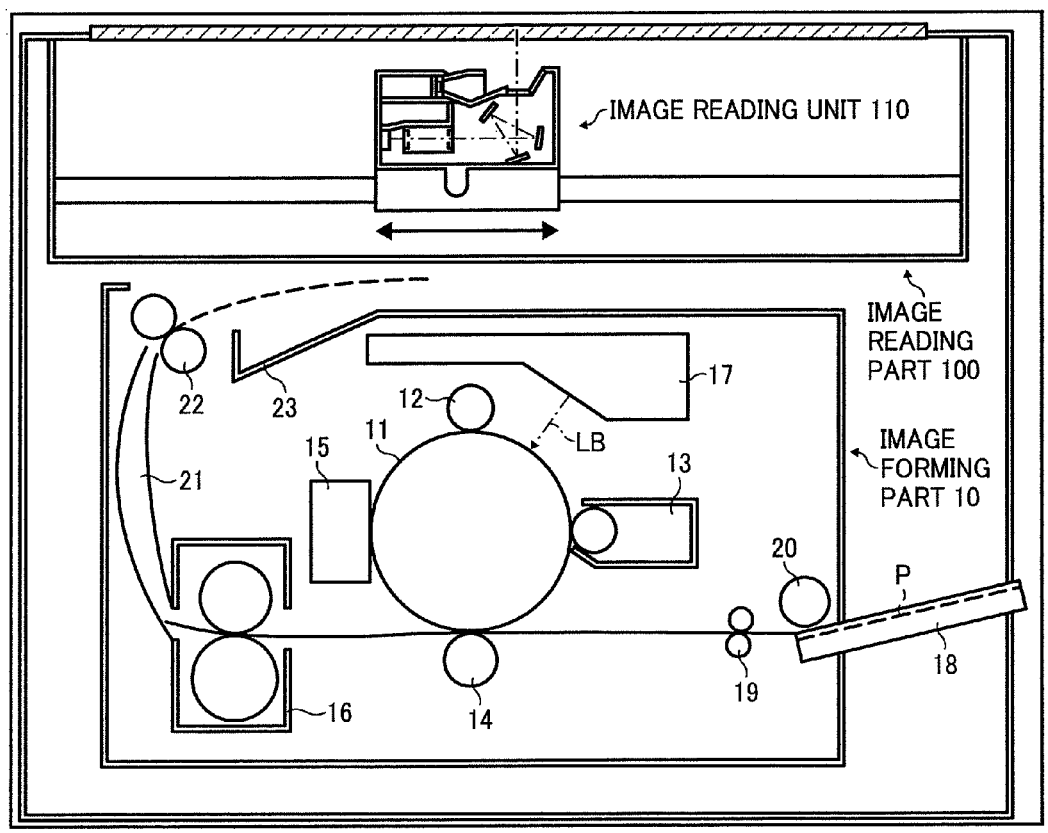
FIG. 2 is a side cross sectional diagram that illustrates in a frame format an image forming apparatus in which an image reading part of an embodiment of the present invention is applied.
Figure 4B:
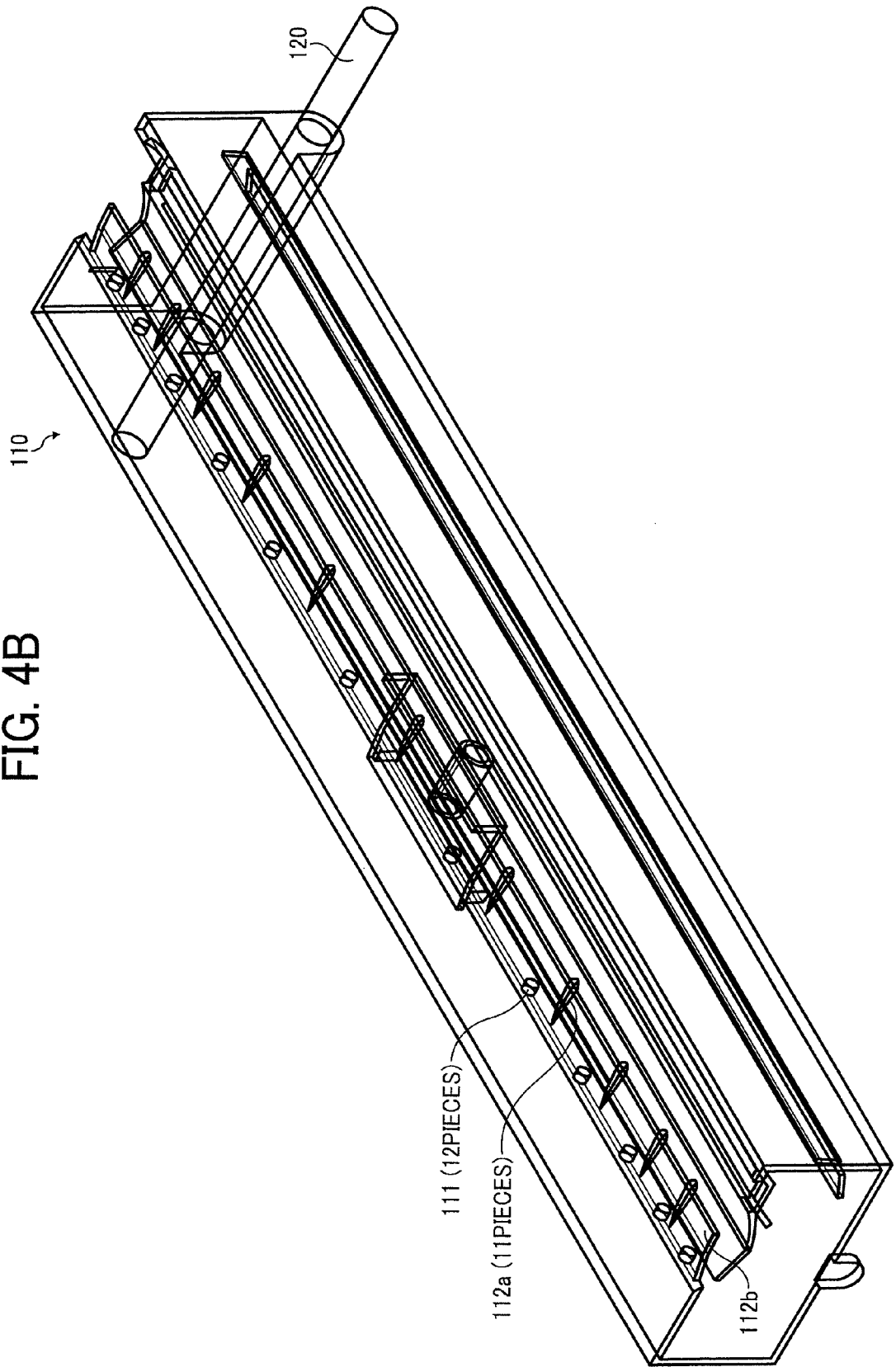
FIG. 4B is an internal perspective view illustrating an image reading unit that constitutes the image reading part of the first embodiment.
Figure 5:
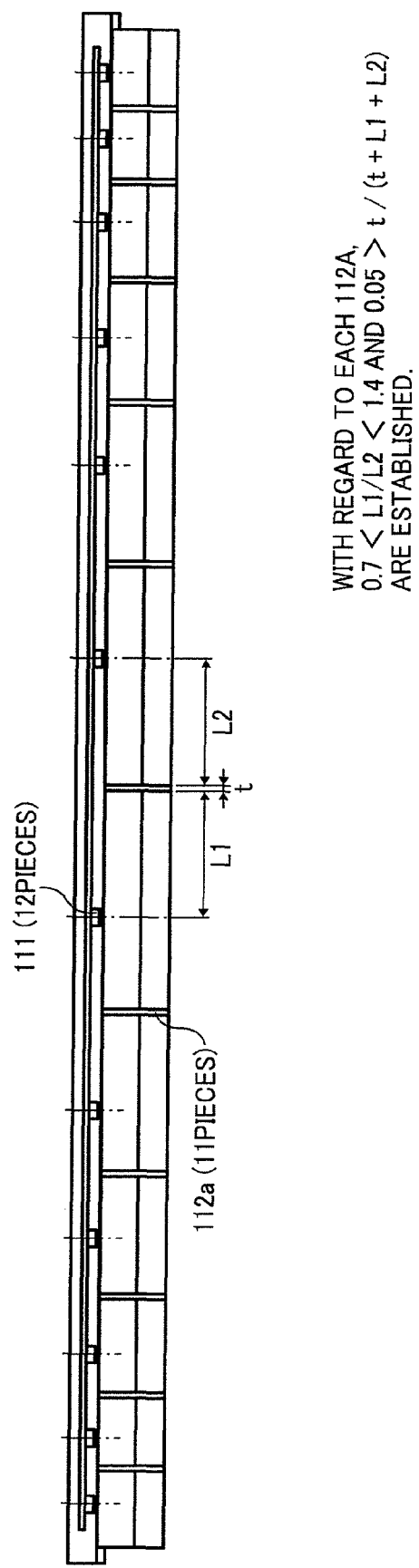
FIG. 5 is a side surface diagram viewing strengthening rib shaped bodies and a light source part that constitutes the image reading unit from a direction of an arrow A of FIG. 3.
Figure 6A:
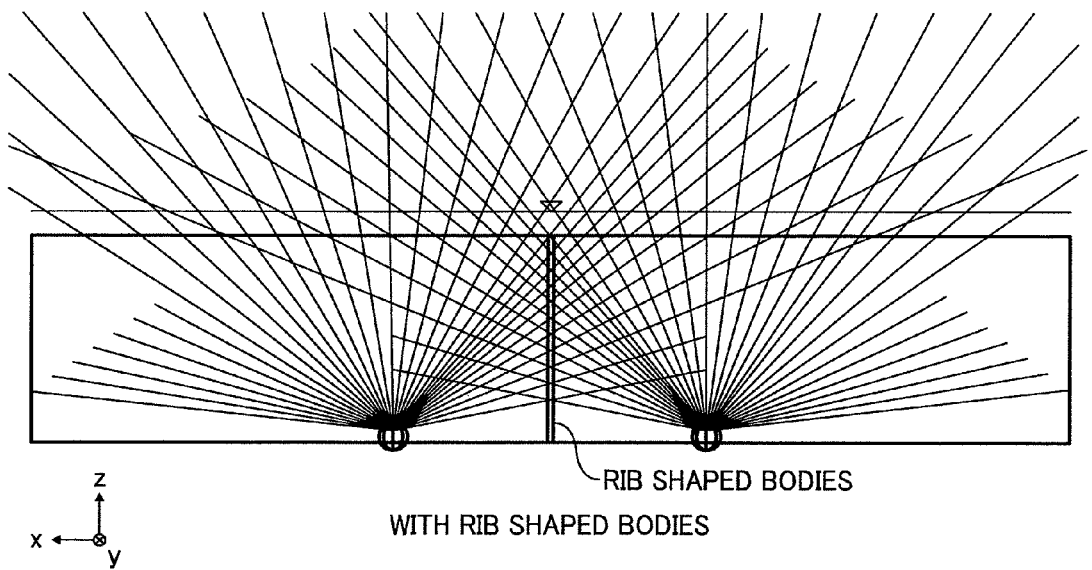
FIG. 6A is a diagram that illustrates a fact in the first embodiment that a behavior of outgoing light from the light source part (LED) is approximately the same regardless of whether the strengthening rib shaped bodies are present or not and in particular, a case in which the strengthening rib shaped bodies are present.
Figure 6B:
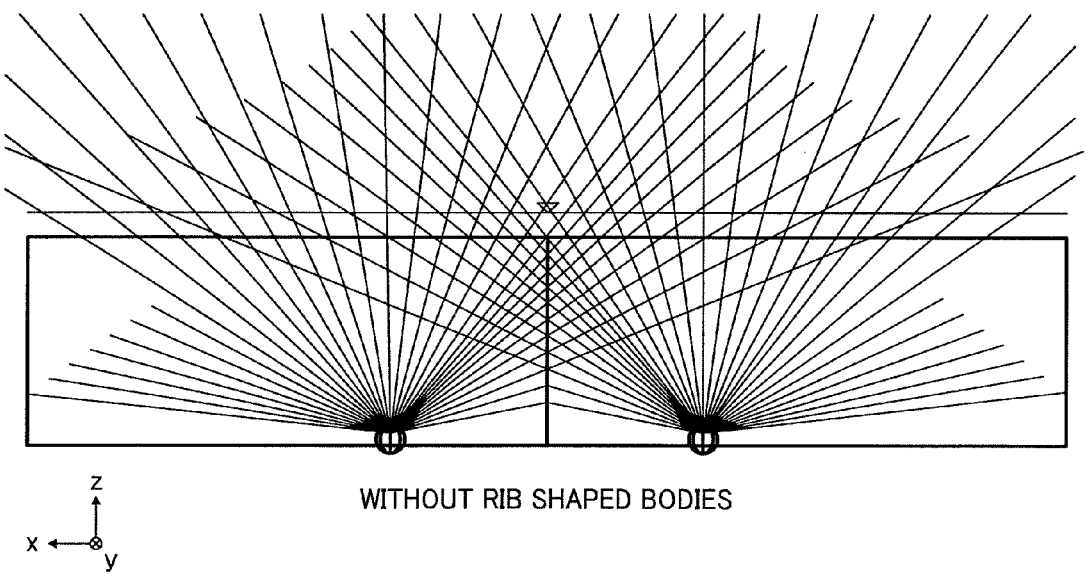
FIG. 6B is a diagram that illustrates a fact in the first embodiment that a behavior of outgoing light from the light source part (LED) is approximately the same regardless of whether the strengthening rib shaped bodies are present or not and in particular, a case in which the strengthening rib shaped bodies are not present.

FIG. 2 is a side cross sectional diagram that illustrates in a frame format an image forming apparatus in which an image reading part of an embodiment of the present invention is applied. FIG. 3 is a side cross sectional diagram of an image reading part of a first embodiment of the present invention. FIG. 4A is an external perspective view illustrating an image reading unit that constitutes the image reading part of the first embodiment. FIG. 4B is an internal perspective view illustrating an image reading unit that constitutes the image reading part of the first embodiment. FIG. 5 is a side surface diagram viewing strengthening rib shaped bodies and a light source part that constitutes the image reading unit from a direction of an arrow A of FIG. 3. FIG. 6A is a diagram that illustrates a fact in the first embodiment that a behavior of outgoing light from the light source part (LED) is approximately the same regardless of whether the strengthening rib shaped bodies are present or not and in particular, a case in which the strengthening rib shaped bodies are present. FIG. 6B is a diagram that illustrates a fact in the first embodiment that a behavior of outgoing light from the light source part (LED) is approximately the same regardless of whether the strengthening rib shaped bodies are present or not and in particular, a case in which the strengthening rib shaped bodies are not present.

First, an image forming apparatus is described with reference to FIG. 2. As illustrated in FIG. 2, an image forming apparatus GK includes a first image reading part 100 and an image forming part 10. The first image reading part 100 includes a first image reading unit 110 which is a chief part of the present invention. The image forming part 10 includes a drum shaped latent image support body 11. A charging device, that is, a charging roller, an image development device 13, a transfer roller 14 and a cleaning device 15 are included in a periphery thereof. A corona charger can be used as the charging device. Furthermore, a light scanning device 17 is disposed. The light scanning device 17 receives manuscript information from the image reading part or the like and external parts to perform light scanning using laser beams LB so that exposure by light writing is performed between the charging roller 12 and the image development device 13. When image formation is performed, a photoconductor of a light conductive property, that is, an image support body 11 is rotated clockwise at equal speed. A surface of the image support body 11 is charged uniformly by the charging roller 12. Light writing is done by the laser beam LB from the light scanning device 17. When exposure by the light writing is received, an electrostatic latent image is formed.

The formed electrostatic latent image is a so called "negative latent image" in which an image forming part is exposed. A cassette 18 storing transfer paper P is detachable from a main body of the image forming apparatus GK. In a mounted state as illustrated in the figure, an uppermost piece of the stored transfer paper P is fed by a paper feeding roller 20. A tip end part of the fed transfer paper P is caught between a resist roller pair 19. The resist roller pair 19 sends in the transfer paper P to a transfer part in a timing which a toner image on the image support body 11 moves to a transfer position. The sent in transfer paper P is doubled to the toner image at the transfer part and is electrostatically transferred with the toner image due to workings of the transfer roller 14.

The transfer paper P transferred with the toner image is sent to a fixing device 16. The toner image is fixed by the fixing device 16 to pass through a carrier path 21 and eventually discharged onto a tray 23 by a discharge roller pair 22. The surface of the image support body 11 after the toner image transfer is cleaned by a cleaning device 15 and removed of residual toners and paper powders or the like. The image support body 11 is a photoconductor of light conductive properties. By uniformly charging and light scanning the image support body 11, an electrostatic latent image is formed and the formed electrostatic latent image is visualized as a toner image.

Next, with reference to FIG. 3, FIG. 4A, FIG. 4B and FIG. 5, the first image reading part 100 and the first image reading unit 110 are described. As illustrated in FIG. 3, FIG. 4A and FIG. 4B, a light source part 111, an illumination reflective part 112, a reading reflective part 113 and a contraction imaging lens are disposed in the first image reading part 100 including the illumination device. Light emitted from the light source part 111 illuminates a manuscript 102 via the illumination reflective part 112. Reflected light from the manuscript 102 is lead to the contraction imaging lens 114 via the reading reflective part 113 and eventually formed an image on a line sensor 115. In the case a longitudinal direction (left and right direction of FIG. 3) of the manuscript 102 needs to be read, the first image reading unit 110 is driven by a not illustrated timing belt connected to a not illustrated motor. Positions and postures of the first image reading unit 110 are controlled by a movement shaft 120. The first image reading unit 110 is moved in a way parallel to the contact glass 101 towards a longitudinal direction of the manuscript so that a whole manuscript can be read. In order to illuminate the manuscript, an approximate same length as the manuscript width becomes necessary. LEDs of the light source part 111 are used in which a plurality of LED elements are lined to an array.

An upside reflective surface 112b of the illumination reflective part 112, in order to secure small size, light weight of a unit and space distances with the contact glass 101, resin made parts of a comparatively thin walled shape but with a broad plain is used as a base and a surface functioning as a reflective surface is applied aluminum vapor deposition. 112c and 112d are lower side reflective surfaces. In addition, 112e is a reflective surface disposed in a position opposed to a light emitting surface of the light source part 111. Each of the above described reflective surfaces 112c, 112d and 112e is applied aluminum vapor deposition with a resin made part the same to the upside reflective surface 112b set as a base. In addition, the upside reflective surface 112b includes a strengthened rib shaped body 112a in the reflective surface to realize a constitution in which deformation of the comparatively thin walled upside reflective surface 112b due to flexures in a gravitational direction by self weight is suppressed.

Plain surface parts of both side of the strengthening rib shaped bodies 112a are reflective surfaces. As illustrated in FIG. 5, between a plurality of LEDs of the light source part 111, the strengthening rib shaped bodies are disposed to have a shape extending in approximately orthogonal direction to a straight line connecting adjacent LEDs as the light source 111. The strengthening rib shaped bodies are disposed at a position with an approximately equal distance from adjacent LEDs and satisfy the following formulas (conditional expressions) (1) and (2). In addition, formulas (1) and (2) are also illustrated in FIG. 5.

$$0.7 < L1/L2 < 1.4 \quad \text{formula (1)}$$

and $$0.05 > t/(L1+L2+t) \quad \text{formula (2)}$$

Hereby, L1 is a shortest distance from one of the two adjacent point light sources to a reflective surface of the rib shaped body. L2 is a shortest distance from another point light source to the reflective surface of the rib shaped body. t is an average wall thickness of the rib shaped body. Therefore, as illustrated in FIG. 6A and FIG. 6B, a behavior of outgoing light from the light source part (LED) 111 is approximately the same regardless of whether the strengthening rib shaped bodies 112a are present or not. As illustrated in the next described FIG. 8A, there is also no great difference to illuminance distribution.

Figure 7:
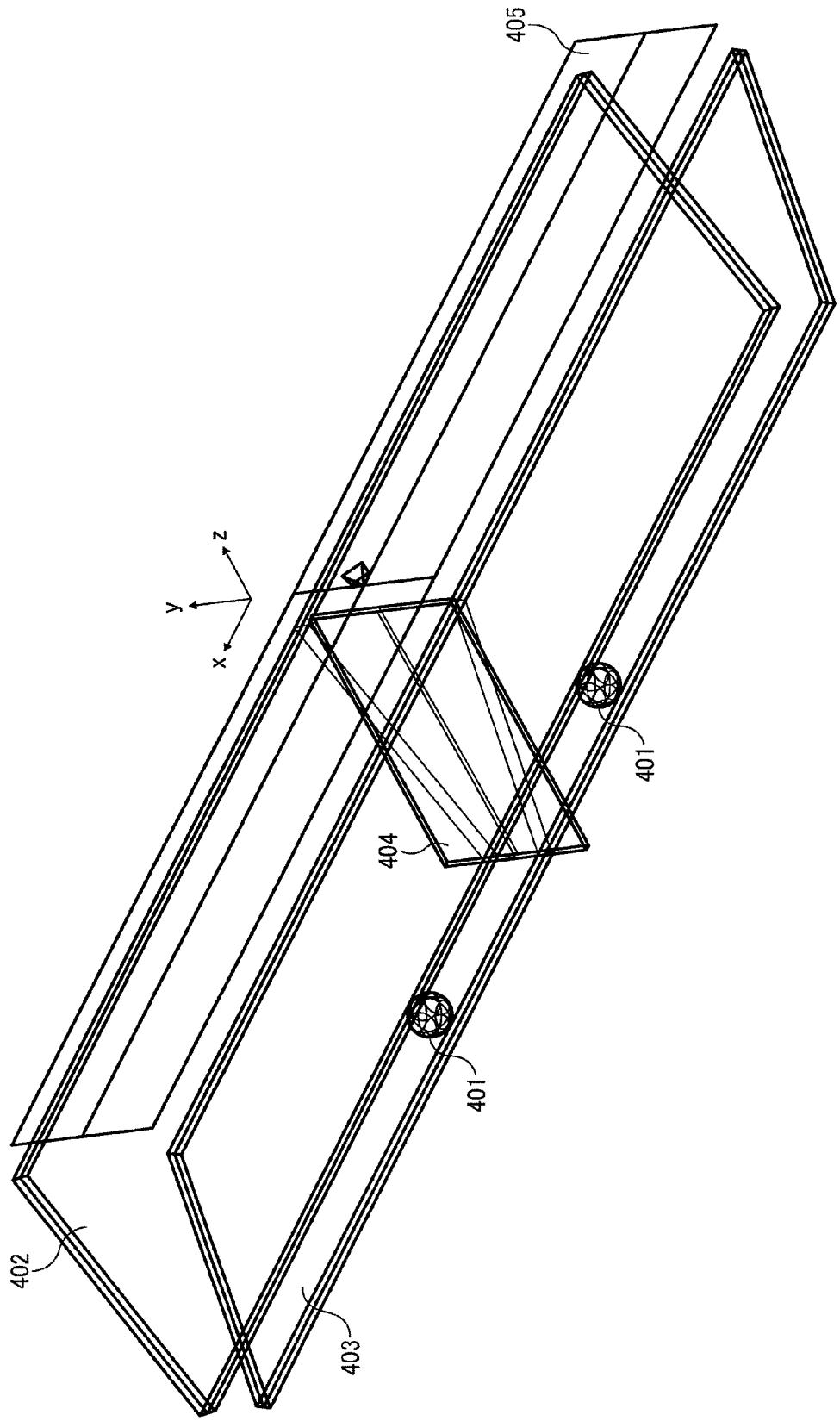
FIG. 7 is a perspective view of an illumination system used for calculating changes of illuminance distribution in the present embodiment for both the cases in which strengthening rib shaped bodies are present and not present.
Figure 8A:
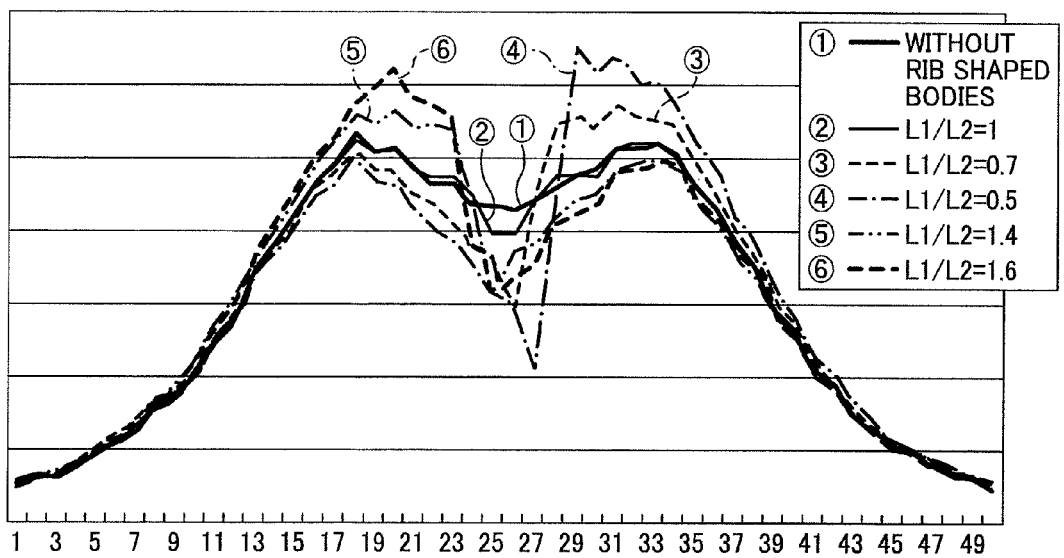
FIG. 8A is a diagram illustrating a fact that there is no great difference to illuminance distribution in the present embodiment for both the cases in which strengthening rip shaped bodies are present and not present, in particular, a diagram that illustrates changes of illuminance distribution against a L1/L2 value.
Figure 8B:
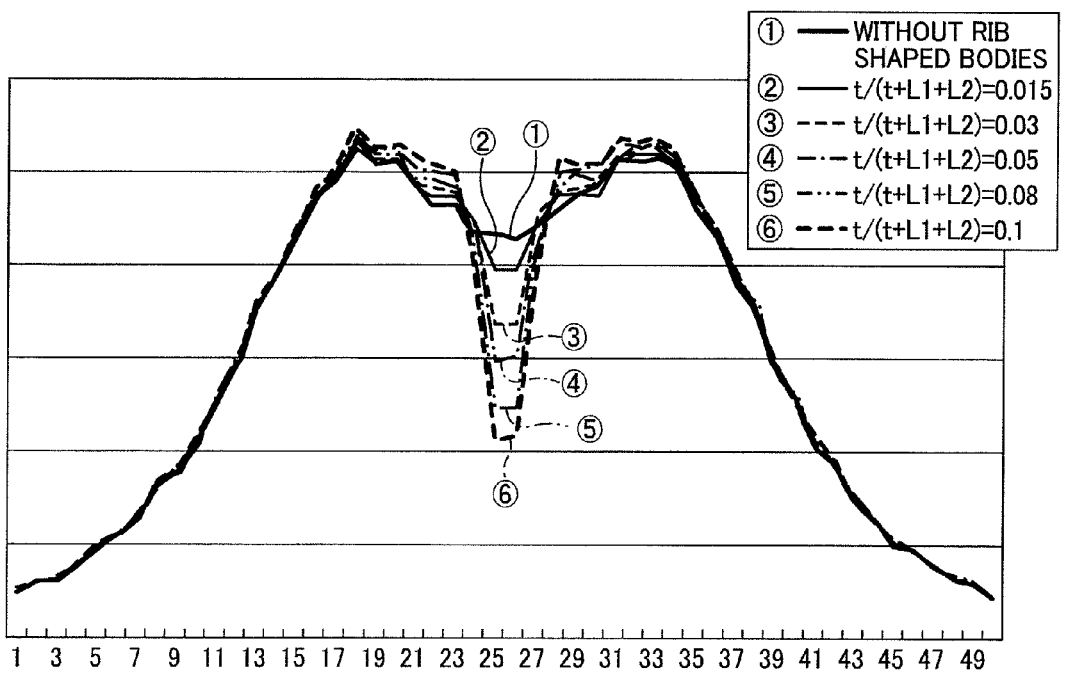
FIG. 8B is a diagram illustrating a fact that there is no great difference to illuminance distribution in the present embodiment for both the cases in which strengthening rip shaped bodies are present and not present, in particular, a diagram that illustrates changes of illuminance distribution against a t/(L1+L2+t) value.

Hereby FIG. 8A and FIG. 8B illustrate illuminance distribution calculation results of the illumination system illustrated in FIG. 7. In the illumination system illustrated in FIG. 7, two point light sources 401, an upper reflective plate 402 and a lower reflective plate 403 are disposed. Between the two point light sources 401, rib shaped bodies 404 extend in a direction orthogonal to a straight line connecting the two point light sources with both surfaces thereof being reflective surfaces and come into contact with an upper reflective plate 402 and a lower reflective plate 403. FIG. 8A is calculation results of illuminance distribution in a irradiated surface 405 when a shortest distance from point light sources 401 to a reflective surface of rib shaped bodies 404 is defined as L1 and L2 as illustrated in FIG. 5 in which a value of L1/L2 is gradually shifted. FIG. 8B is a diagram illustrating calculation results of illuminance distribution in a case of a next described second embodiment. In addition to the above described L1 and L2, a thickness t of rib shaped bodies 404 is defined. The diagram illustrates calculation results of illuminance distribution in the irradiated surface 405 in which a value of t/(L1+L2+t) is gradually shifted. From the results illustrated in FIG. 8A and FIG. 8B, there is no large influences to illuminance distribution within a range in which the two relationship formulas of the formula (1) and (2) are satisfied.

[The Second Embodiment]

Figure 10B:
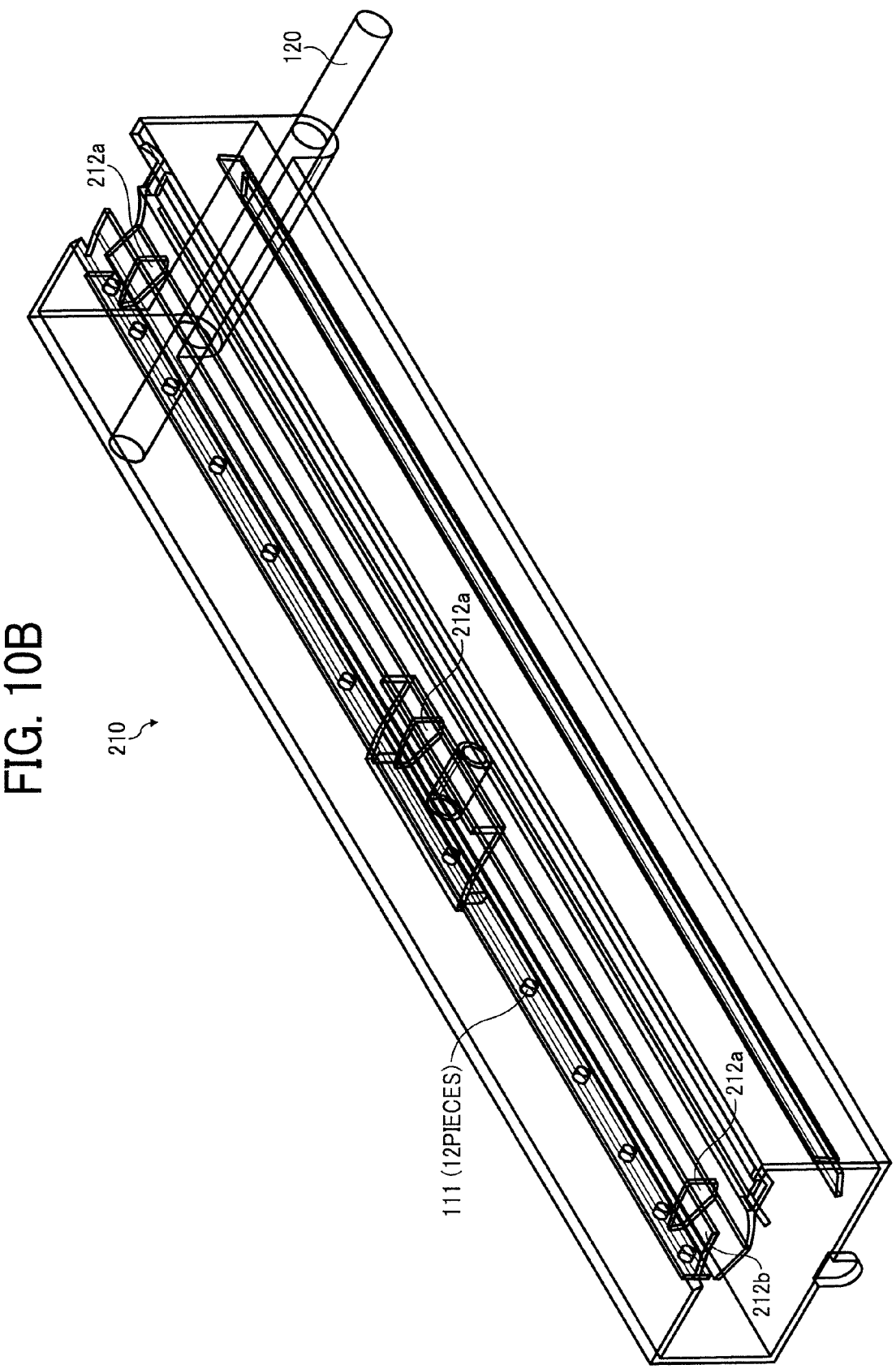
FIG. 10B is an internal perspective view illustrating an image reading unit that constitutes the image reading part of the second embodiment.

Next, a second embodiment is described. FIG. 9 is a side cross sectional diagram of an image reading part of a second embodiment of the present invention. FIG. 10A is an external perspective view illustrating an image reading unit that constitutes the image reading part of the second embodiment. FIG. 10B is an internal perspective view illustrating an image reading unit that constitutes the image reading part of the second embodiment. FIG. 11 is a side surface diagram viewing strengthening rib shaped bodies and a light source part that constitutes the image reading unit of the second embodiment from a direction of an arrow B of FIG. 9. As illustrated in FIG. 9, FIG. 10A and FIG. 10B, in a constitution of a second image reading part 200 including the illumination device, a manuscript 102 is disposed on a contact glass 101, a second image reading unit 210 is disposed in a lower part of the contact glass 101. A light source part 111, an illumination reflective part 212, a reading reflective part 113 and a contraction imaging lens 114 are disposed in the second image reading unit 210. Light emitted from the light source part 111 illuminates the manuscript 102 via the illumination reflective part 112. Reflected light from the manuscript 102 is lead to the contraction imaging lens 114 via the reading reflective part 113 and eventually formed an image on a line sensor 115.

In the case a longitudinal direction (left and right direction of FIG. 9) of the manuscript 102 needs to be read, the second image reading unit 210 is driven by a not illustrated timing belt connected to a not illustrated motor. Positions and postures of the second image reading unit 210 are controlled by a movement shaft 120. The second image reading unit 210 is moved in a way parallel to the contact glass 101 towards a longitudinal direction of the manuscript so that a whole manuscript can be read. In order to illuminate the manuscript, an approximate same length as the manuscript width becomes necessary. LEDs of the light source part 111 are used in which a plurality of LED elements are lined to an array. An upside reflective surface 212b of the illumination reflective part 212, in order to secure small size, light weight of a unit and space distances with the contact glass 101, resin made parts of a comparatively thin walled shape but with a broad plain is used as a base and a surface functioning as a reflective surface is applied aluminum vapor deposition. In addition, The upside reflective surface 212b is a part detachable from a second image reading unit 210 because the light source part 111 needs to be incorporated. When the second image reading unit 210 is in an assembled state, the strengthening rib shaped bodies 212a bump into a lower side reflective surface 212c (the rib shaped bodies come into contact with two reflective surfaces). A constitution is adopted in which deformation of the comparatively thin walled upside reflective surface 212b due to flexures in a gravitational direction by self weight is suppressed, 212d is a reflective surface disposed in a position opposed to the light emitting surface of the light source part 111. Even in the case functionally not allowable warping remains after a molding of the upside reflective surface 212b, molding conditions should be arranged so that a convex shape is present to a side of the upside reflective surface 212b disposed with the strengthening rib shaped bodies 212a. Therefore, when in a state assembled as a unit, a constitution is adopted in which a degree of flatness of the upside reflective surface 212b can be secured by the strengthening rib shaped bodies 212a.

Plain surface parts of both side of the strengthening rib shaped bodies 212a are reflective surfaces. As illustrated in FIG. 11, between a plurality of LEDs of the light source part 111, the strengthening rib shaped bodies are disposed to have a shape extending in approximately orthogonal direction to a straight line connecting adjacent LEDs as the light source 111. The strengthening rib shaped bodies are disposed at a position with an approximately equal distance from adjacent LEDs and satisfy the following formulas (conditional expressions) (1) and (2). In addition, formulas (1) and (2) are also illustrated in FIG. 11. Therefore, as illustrated in FIG. 6A and FIG, 6B, a behavior of outgoing light from the light source part (LED) 111 is approximately the same regardless of whether the strengthening rib shaped bodies 212a are present or not. As illustrated in the next described FIG. 8B, there is also no great difference to illuminance distribution.

[Third Embodiment]

Figure 12:
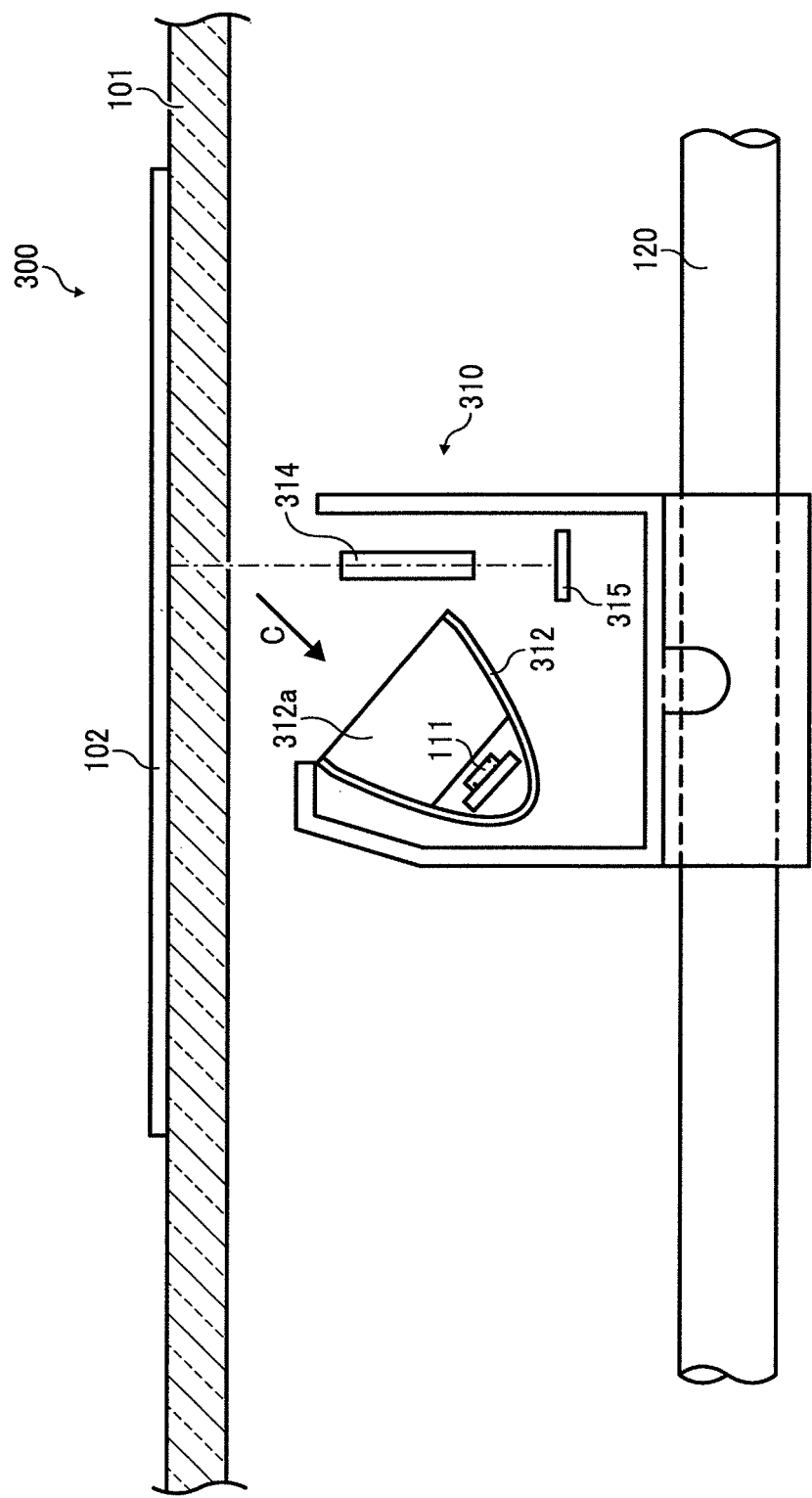
FIG. 12 is a side cross sectional diagram of an image reading part of a third embodiment of the present invention.
Figure 13A:
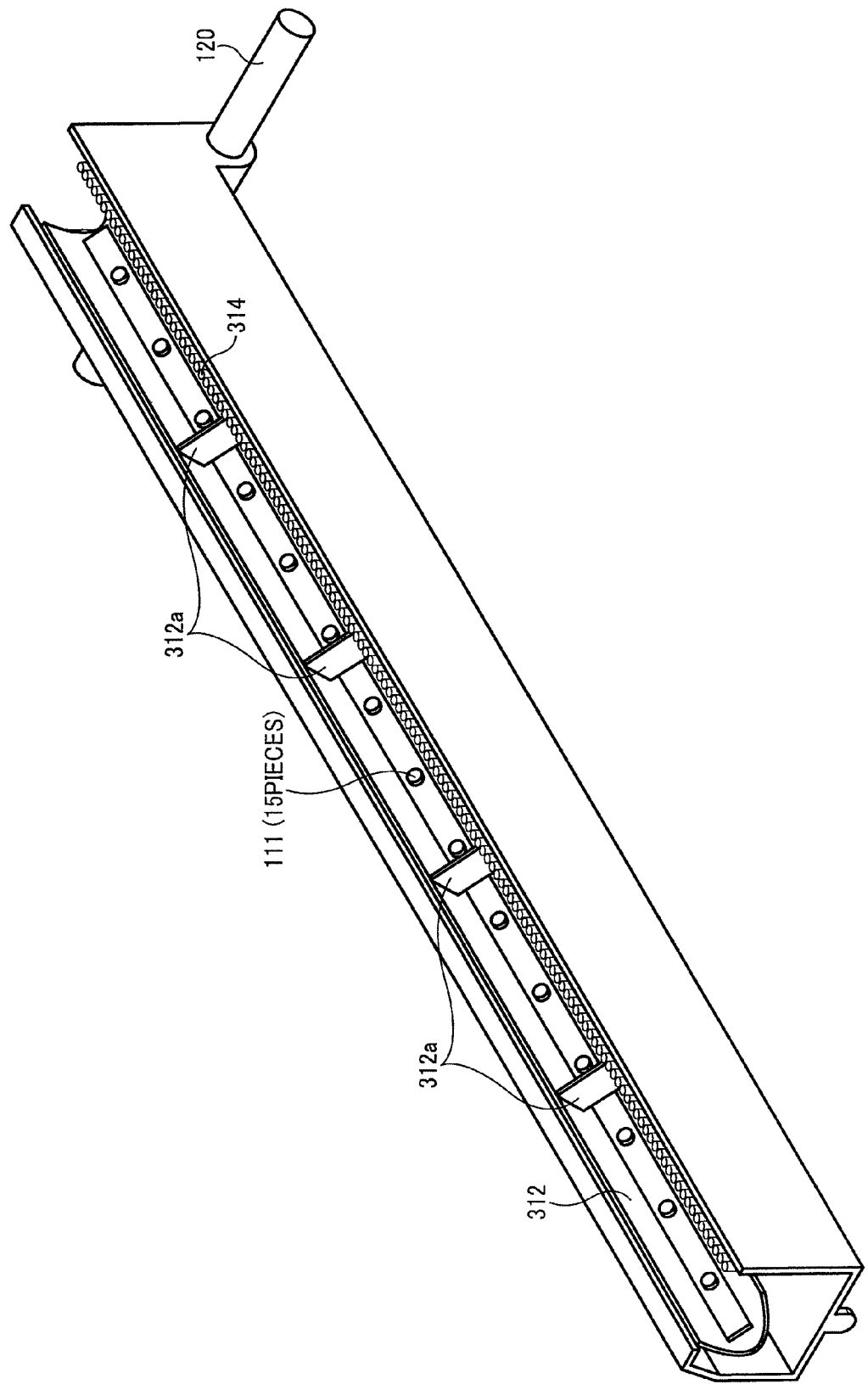
FIG. 13A is an external perspective view illustrating an image reading unit that constitutes the image reading part of the third embodiment.
Figure 13B:
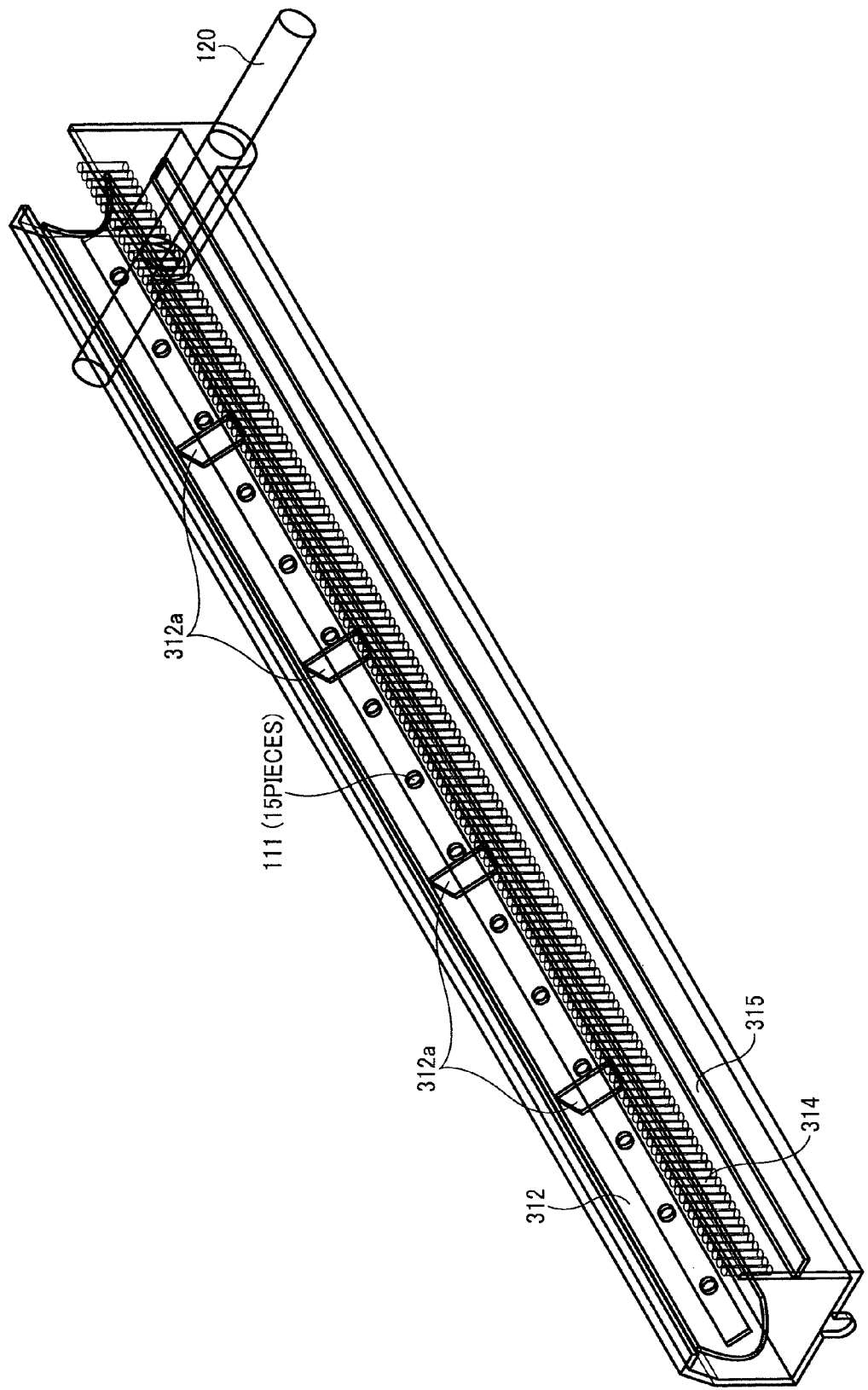
FIG. 13B is an internal perspective view illustrating an image reading unit that constitutes the image reading part of the third embodiment.
Figure 14:
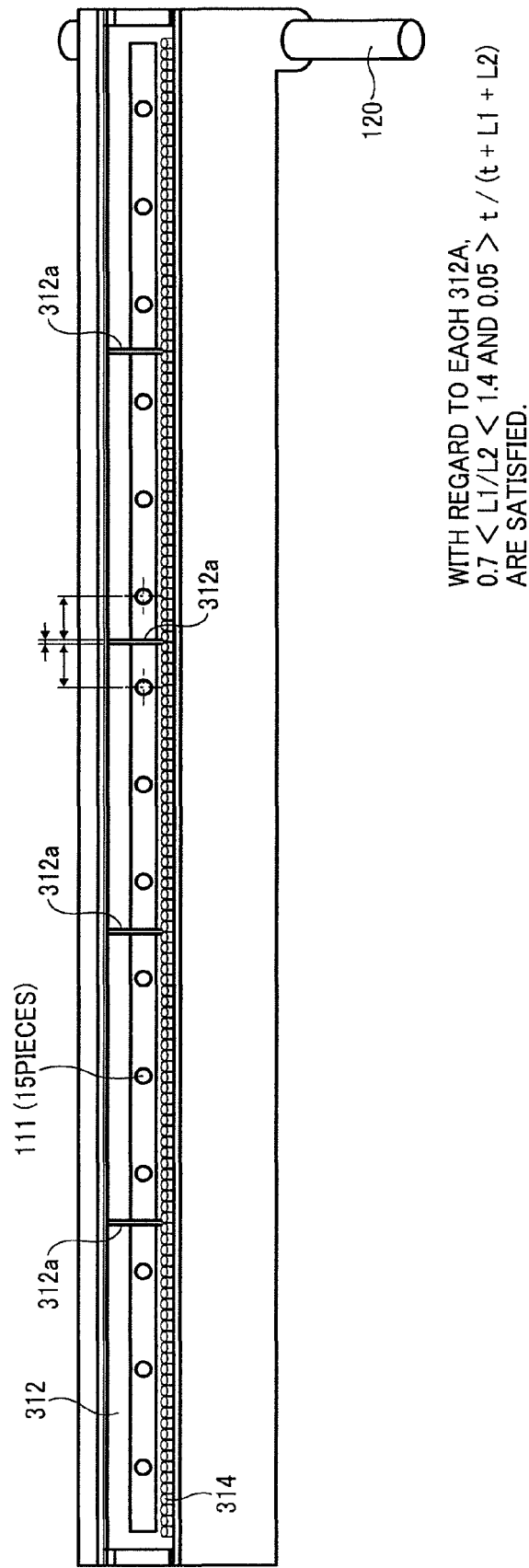
FIG. 14 is a side surface diagram viewing strengthening rib shaped bodies and a light source part that constitutes the image reading unit of the third embodiment from a direction of an arrow C of FIG. 12.

Next, a third embodiment is described. FIG. 12 is a side cross sectional diagram of an image reading part of a third embodiment of the present invention. FIG. 13A is an external perspective view illustrating an image reading unit that constitutes the image reading part of the third embodiment. FIG. 13B is an internal perspective view illustrating an image reading unit that constitutes the image reading part of the third embodiment. FIG. 14 is a side surface diagram viewing strengthening rib shaped bodies and a light source part that constitutes the image reading unit of the third embodiment from a direction of an arrow C of FIG. 12. As illustrated in FIG. 12, FIG. 13A and FIG. 13B, in a constitution of a third image reading part 300 including the illumination device, a manuscript 102 is disposed on a contact glass 101, a third image reading unit 310 is disposed in a lower part of the contact glass 101. A light source part 111, an illumination reflective part 312 and an equal magnification imaging lens array 314 are disposed in the third image reading unit 310. A plurality of equal magnification imaging lenses are arrayed to constitute the equal magnification imaging lens array 314. Light emitted from the light source part 111 illuminates the manuscript 102 via the illumination reflective part 312.

Reflected light from the manuscript 102 is lead to the equal magnification imaging lens array 314 and eventually formed an image on a line sensor 315. In the case a longitudinal direction (left and right direction of FIG. 13) of the manuscript 102 needs to be read, the third image reading unit 310 is driven by a not illustrated timing belt connected to a not illustrated motor. Positions and postures of the third image reading unit 310 are controlled by a movement shaft 120. The third image reading unit 310 is moved in a way parallel to the contact glass 101 towards a longitudinal direction of the manuscript so that a whole manuscript can be read. In order to illuminate the manuscript, an approximate same length as the manuscript width becomes necessary. LEDs of the light source part 111 are used in which a plurality of LED elements are lined to an array.

The illumination reflective part 312 is obtained by bending a thin aluminum material. The strengthening rib shaped materials 312a are disposed to be inserted through an internal side thereof. The illumination reflective part 312 made from a thin aluminum material is constituted to be shaped along an end surface shape of the strengthening rib shaped materials 312a assembled in an insertion like way. Metal materials or glass materials can be used for the strengthening rib shaped materials 312a. Plain surface parts of both side of the strengthening rib shaped bodies 312a are reflective surfaces. As illustrated in FIG. 14, between a plurality of LEDs of the light source part 111, the strengthening rib shaped bodies are disposed to have a shape extending in approximately orthogonal direction to a straight line connecting adjacent LEDs as the light source 111. The strengthening rib shaped bodies are disposed at a position with an approximately equal distance from adjacent LEDs and satisfy the following formulas (conditional expressions) (1) and (2). In addition, formulas (1) and (2) are also illustrated in FIG. 14. Therefore, as illustrated in FIG. 6A and FIG. 6B, a behavior of outgoing light from the light source part (LED) 111 is approximately the same regardless of whether the strengthening rib shaped bodies 312a are present or not. As illustrated in the next described FIG. 8B, there is also no great difference to illuminance distribution.

The above-described embodiment is only a representative embodiment of the present invention. The present invention is not limited to the above-described embodiment. That is, various modifications and changes can be made to the above embodiment within a range not deviating from the scope of the present invention.

What is claimed is:

1. An illumination device that irradiates an irradiation surface, the illumination device comprising:
   a plurality of point light sources each including a light emitting surface;
   a first reflective member disposed between the light sources and the irradiation surface; and
   a second reflective member disposed to face the light emitting surfaces in a direction that is orthogonal to the light emitting surfaces,
   wherein the first reflective member includes two reflective surfaces which face each other, and wherein the first reflective member includes rib shaped bodies including a reflective surface and disposed in a passageway side of light emitted from the light sources,
   wherein a distance between the reflective surfaces which face each other increases with increasing distance away from the light sources, and
   wherein each rib shaped body is situated at a position of an approximately equal distance from two adjacent point light sources and is approximately orthogonal to a straight line connecting the adjacent point light sources.

2. The illumination device according to claim 1, wherein a distance from one of the two adjacent sources to a corresponding reflective surface of the rib shaped bodies is L1, a distance from another of the two adjacent light sources to a corresponding reflective surface of the rib shaped bodies is L2, t an average wall thickness of the rib shaped bodies, and $0.7 < L1/L2 < 1.4$ and $0.05 > t/(L1+L2+t)$.

3. The illumination device according to claim 1, wherein the reflective surfaces of the rib shaped bodies are formed by any surface workings of coating, plating and vapor deposition.

4. The illumination device according to claim 1, further comprising an end surface, and where the end surface is approximately orthogonal to the reflective surfaces of the rib shaped bodies, and wherein the end surface comes into contact with two or more of the reflective surfaces included in the reflective members.

5. The illumination device according to claim 4, wherein a material that constitutes the rib shaped is made from a metallic plate, and the metallic plate is different from a part constituting the reflective member coming into contact thereof.

6. The illumination device according to claim 4, wherein a material that constitutes the rib shaped bodies is made from a glass plate, and the glass plate is different from a part constituting the reflective member coming into contact thereof.

7. An image reading apparatus comprising the illumination device according to claim 1.

8. An image forming apparatus comprising the image reading apparatus according to claim 7.

9. The illumination device according to claim 1, wherein a direction where light reflected on the first reflective member illuminates the irradiation surface and a direction where light reflected on the second reflective member illuminates the irradiation surface are different.

10. An illumination device that irradiates an irradiation surface, the illumination device comprising:
    a plurality of light sources; and
    a reflective member disposed between the light sources and the irradiation surface,
    wherein the reflective member includes two reflective surfaces which face each other, and wherein the reflective member includes rib shaped bodies including a reflective surface and disposed in a passageway side of light emitted from the light sources,
    wherein a distance between a e reflective surfaces which face each other increases with increasing distance away from the light sources,
    wherein each rib shaped body is situated at a position of an approximately equal distance from two adjacent point light sources and is approximately orthogonal to a straight line connecting the adjacent point light sources, and
    wherein a distance from one of the two adjacent light sources to a corresponding reflective surface of the rib shaped bodies L1, a distance from another of the two adjacent light sources to a corresponding reflective surfaces of the rib shaped bodies is L2, t is an average wall thickness of the rib shaped bodies, and $0.7 < L1/L2 < 1.4$ and $0.05 > t/(L1+L2+t)$.

* * * * *